May 20, 1941.    R. C. PRATT    2,242,923
VENETIAN BLIND
Filed Aug. 4, 1937    6 Sheets-Sheet 1
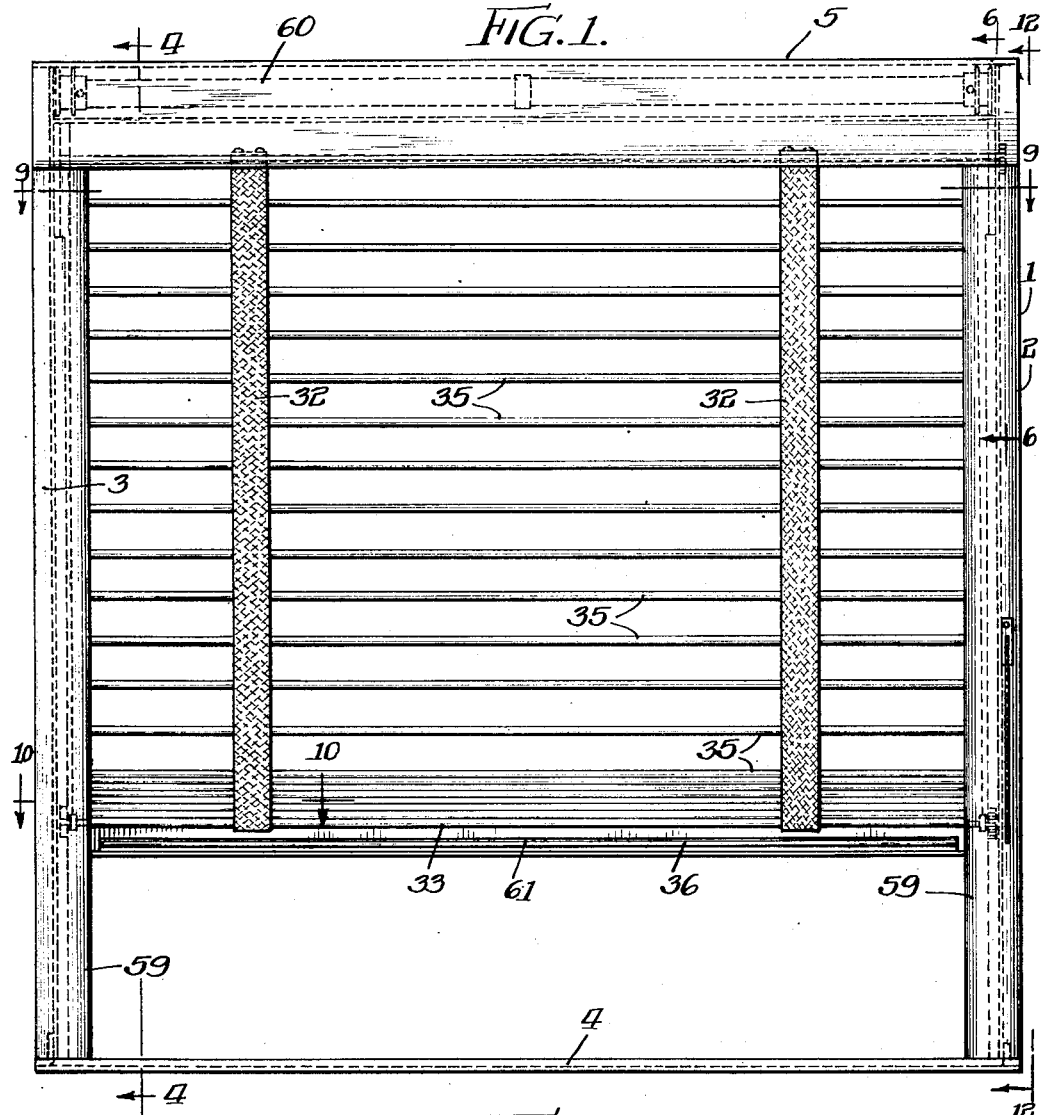
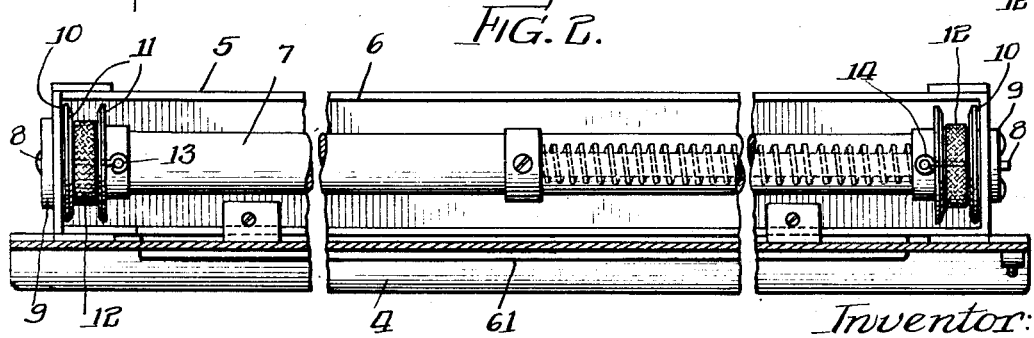
Inventor:
Raymond C. Pratt
By: Cox & Moore attys.

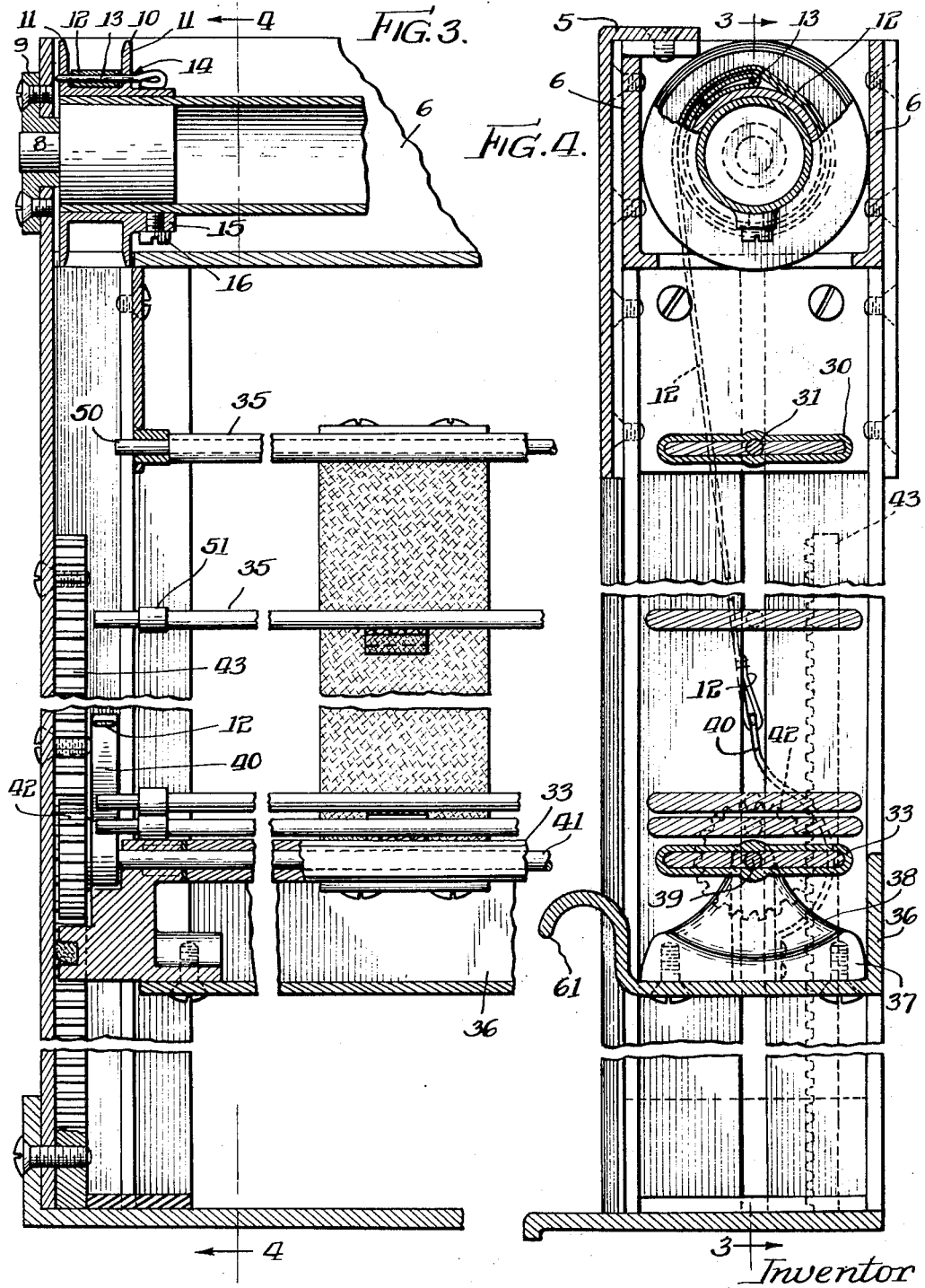

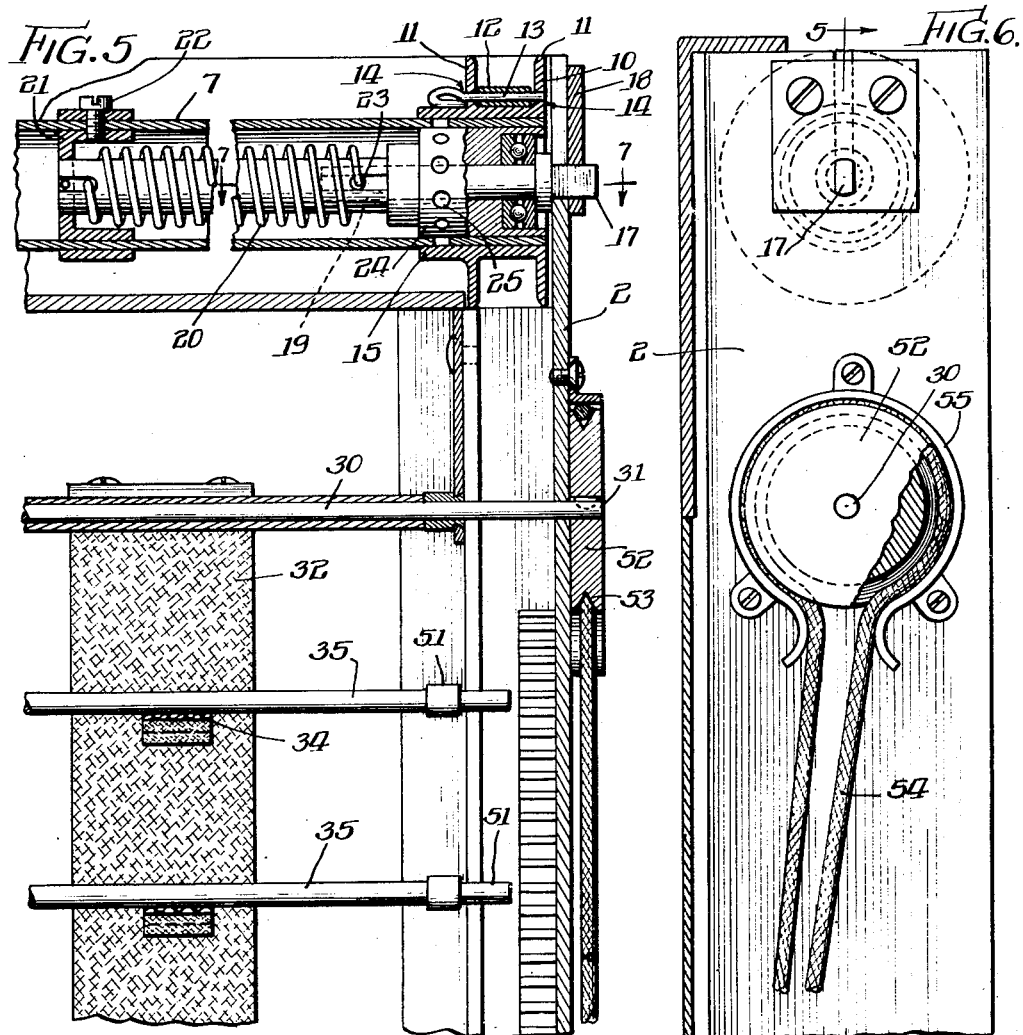
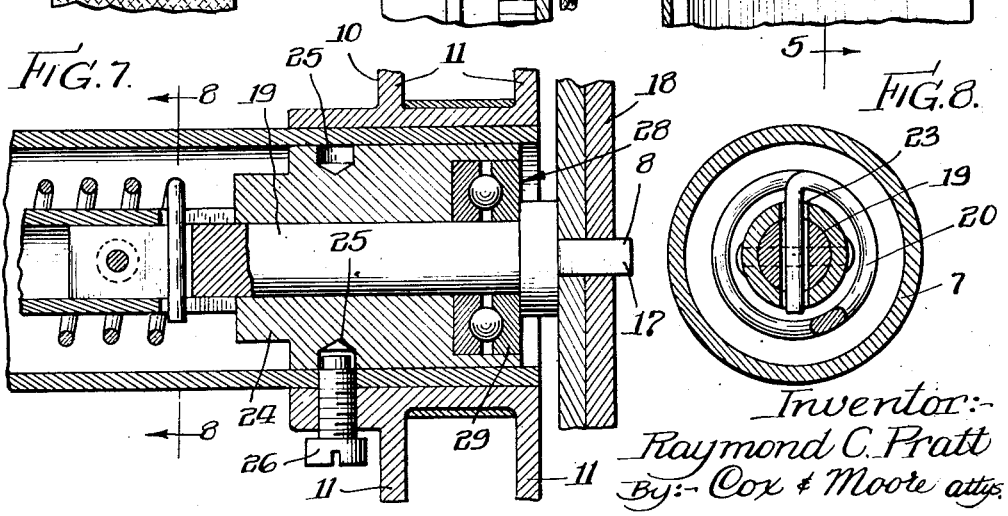

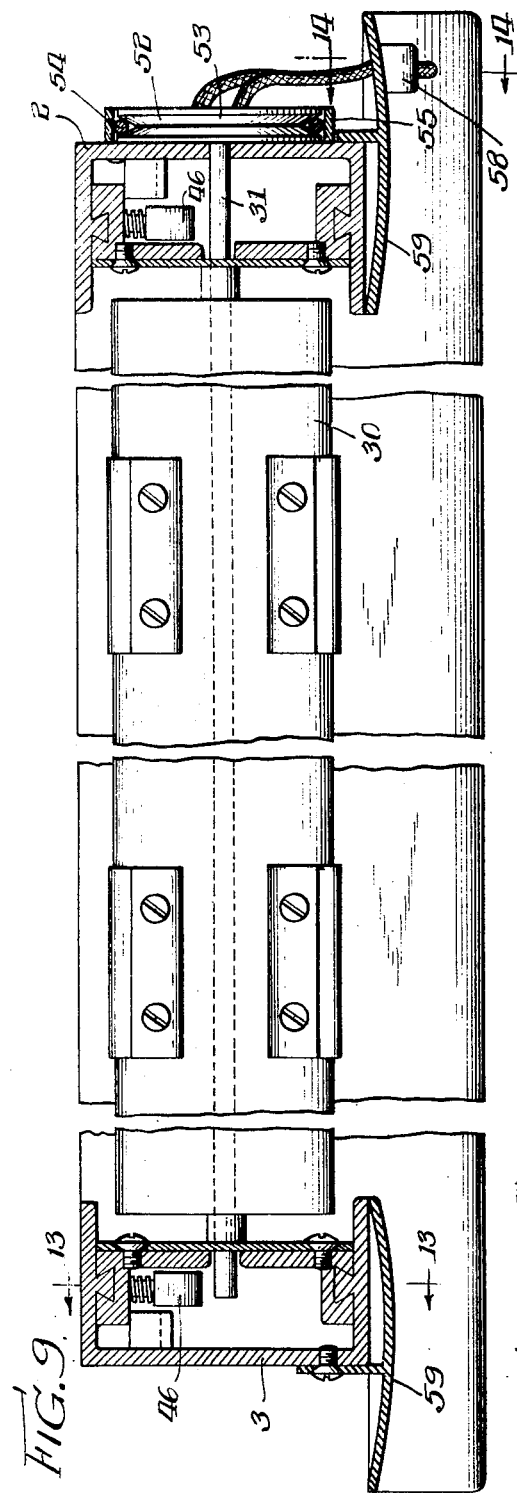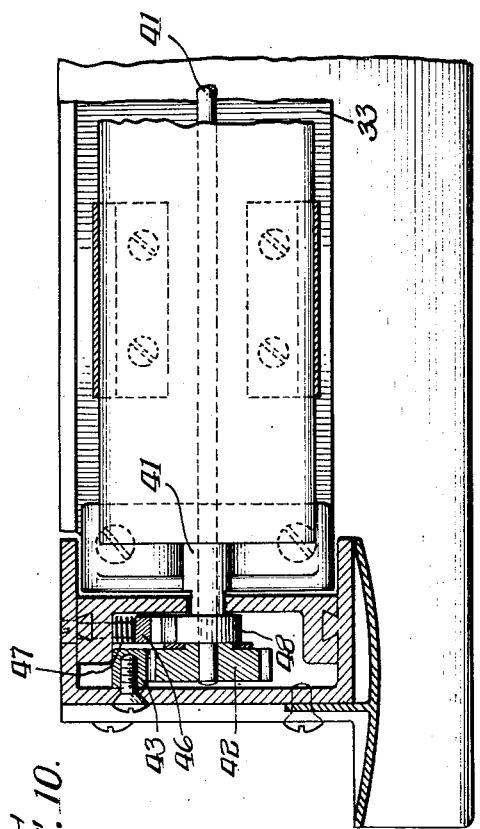

May 20, 1941.　　　R. C. PRATT　　　2,242,923
VENETIAN BLIND
Filed Aug. 4, 1937　　　　6 Sheets-Sheet 5

Inventor:
Raymond C. Pratt
By: Cox & Moore attys

May 20, 1941.  R. C. PRATT  2,242,923
VENETIAN BLIND
Filed Aug. 4, 1937  6 Sheets-Sheet 6
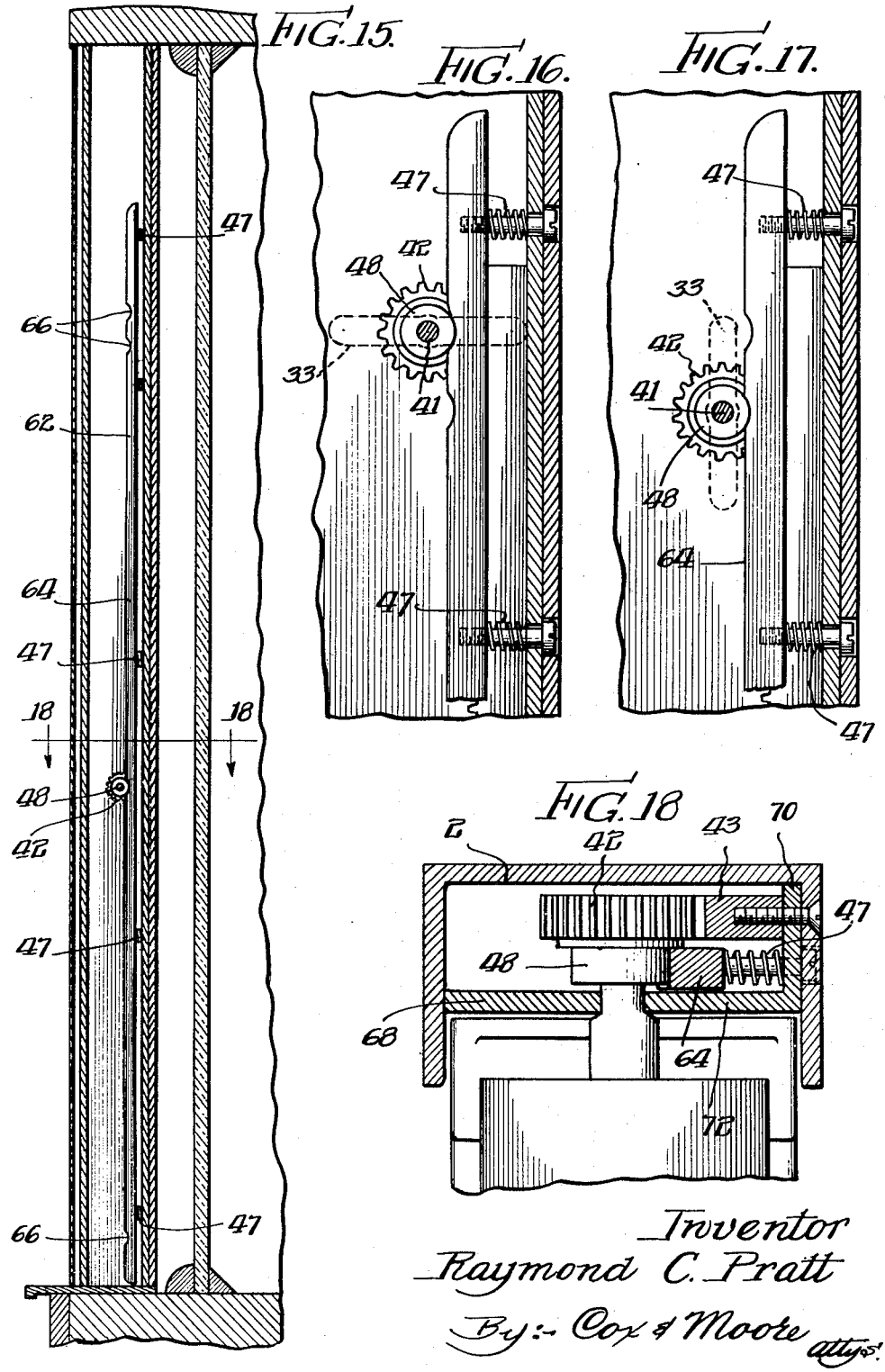
Inventor
Raymond C. Pratt
By:- Cox & Moore attys Patented May 20, 1941

2,242,923

UNITED STATES PATENT OFFICE 2,242,923

VENETIAN BLIND

Raymond C. Pratt, Chicago, Ill., assignor to H. B. Dodge and Company, Chicago, Ill., a corporation of Illinois Application August 4, 1937, Serial No. 157,259

9 Claims. (Cl. 156—17)

This invention relates to Venetian blinds, and particularly to Venetian blinds which are arranged in a frame so that the entire Venetian blind and its co-operating frame may be arranged in an opening or recess provided to receive the frame.

A Venetian blind of this type is disclosed and claimed in applicant's co-pending application, Serial No. 29,774, filed July 5, 1935, Patent No. 2,212,718, August 27, 1940.

Blinds of the type to which this present invention refers are along the lines disclosed and claimed in applicant's co-pending application, Serial No. 623,802, filed July 21, 1932, and issued as Patent No. 2,128,163 on August 23, 1938, the blinds embodying some of the characteristics mentioned therein.

The primary object of the present invention, however, is to provide a Venetian blind which is manually raised and lowered by hand; which is provided with a tension control roller element to assist in counterbalancing the weight of the blind; which is provided with new and improved means including a vertically positioned rack whereby it is impossible for the slats to cant during operation, that is, it will be impossible to have one end of the slat at a higher elevation than the opposite end of the slat; and which is provided with parts and elements thereof arranged, constructed, attached and positioned in a particular manner to make a silently, easily operating, ornamental blind.

Numerous other objects and advantages will be apparent throughout the progress of the following specification.

The accompanying drawings illustrate a selected embodiment of the invention and the views therein are as follows:

Fig. 1 is a detail front elevation of the improved Venetian blind and embodying the invention;

Fig. 2 is a detail top plan view of the blind shown in Fig. 1;

Fig. 3 is a detail elevational section taken on the line 3—3 of Fig. 4;

Fig. 4 is a detail vertical transverse section on the lines 4—4 of Figs. 1 and 3;

Fig. 5 is a detail vertical sectional view similar to Fig. 3 but showing the opposite end and taken on the line 5—5 of Fig. 6;

Fig. 6 is a detail sectional view on the line 6—6 of Fig. 1;

Fig. 7 is a detail sectional view on the line 7—7 of Fig. 5;

Fig. 8 is a detail sectional view on the line 8—8 of Fig. 7;

Fig. 9 is a detail plan section on the line 9—9 of Fig. 1;

Fig. 10 is a detail plan section on the line 10—10 of Fig. 1;

Fig. 11 is a detail elevational view of one of the elements which is connected to the bottom operating bar;

Fig. 15 is a sectional elevation showing an alternative form of stop member;

Fig. 16 is a detail sectional view taken on the same section as Fig. 15 and showing the uppermost position of the bottom bar when in locking relationship with the stop;

Fig. 17 is a section the same as Fig. 16 but showing the relation of the parts when the lower bar is tilted in upper locking position; and Fig. 18 is a sectional detail plan view taken on the line 18—18 of Fig. 15.

Figure 12:
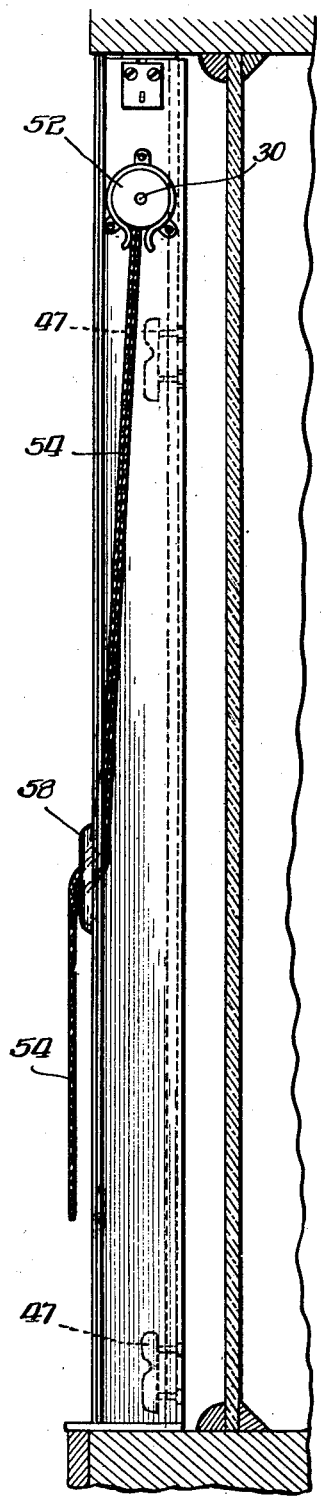
Fig. 12 is a detail vertical sectional view on the line 12—12 of Fig. 1.

Referring to the drawings, 1 designates a frame adapted to be removably inserted into a window casing or the like, said frame comprising a bottom rail or stretcher 4, and vertical and horizontal frame members forming channels 2, 3 and 5. The upper channel comprises a box-like structure indicated generally by the numeral 6, Figs. 2 and 4, into which there is rotatably mounted a roller element 7. The roller element 7 is provided with shafts or pivots 8, Fig. 3, which are suitably journaled in bearings 9. Rollers or pulley members 10 are mounted on each end of the roller element 7 and are each provided with peripheral flanges 11 between which tapes 12 are adapted to be wound. The ends of the tapes 12 are provided with a wire element 13 which is adapted to be received in alined openings or slots 14 provided in each of the rollers or pulleys 10 (see Figs. 3–5). Each pulley or roller 10 is provided with an integral collar 15 having a threaded opening to receive a set screw 16 for fixing the pulleys to the roller 7, as well as to permit the tapes 12 to be properly positioned, that is, in order to properly adjust the tapes with respect to each other so that the lower slat of the blind will lie in a true horizontal plane.

One of the shafts or supporting pins 8 is rectangular in shape as indicated at 17, Figs. 5 and 7, and is received in a rectangularly shaped opening on a plate 18 attached to the frame along one of the side bars. This rectangular end 17 may be the continuation of or attached to a shaft 19 which is arranged inside of the tubular cross roller shaft 7. A spring 20 encircles the shaft 19 and has one of its ends fixed to a bearing 21 which is locked to the shaft 7 in any convenient manner, such as by a set screw 22, Fig. 5. The other end of the spring 20 is connected to the shaft as indicated at 23, Fig. 5. A bearing 24 is fixed to the shaft and is provided with a plurality of notches 25, Fig. 5, and a set screw 26, Fig. 7, is adapted to engage any one of the notches 25. The bearing 24 is provided with a recess 28 into which a ball race 29 is arranged to permit free, easy operation of the roller element 7. By providing the bearing member 24 with the circumferentially spaced notches 25, the proper tension can be had on the spring to provide the proper counterbalance for the blind, and the spring tension can be changed if and when desired. The bearing 24 likewise forms a bearing for the end of the shaft 19.

The purpose of the construction is to counterbalance the slat and is such as to provide the proper tension at all positions of the blind. Therefore, the construction in the top bar 5, including the spring 20 and its co-operating bearing and adjustment elements, allows for the proper counterbalance.

A top bar 30 is pivotally mounted in a part of the frame as indicated at 31, Fig. 5, and is free to be tilted about its axis but is prevented from moving vertically. Spaced ladder tapes 32 are connected to the top bar 30 and to a transverse lower bar 33. These ladder tapes are provided with cross pieces 34 to support the spaced superposed slats 35. A bottom bar 36 spaced immediately below the lower bar 33 is provided with oppositely disposed bearing members 37 fixed thereto, said members having extensions 38, Fig. 4, to which the lower slat member 33 is pivoted as indicated at 39, Fig. 4. Thus the tension of the spring 20 is applied to the roller element 7, and in turn through the tapes 12, said tapes having their lower ends operatively connected to the bottom bar 36 to provide the necessary tension. The bearing memers 37 are of the shape indicated in Fig. 11 and are each provided with a spring member 40, to which the bottoms of the tapes 12 are connected as shown in Fig. 4. The spring member 40 engages the inside of the side channel members 2 and 3 and prevents swaying of the bottom bar 36. A rod 41, Figs. 3 and 10, passes through the lower slat 33 and carries at its opposite ends gear wheels 42 which engage racks 43 mounted in the channel side members 2 and 3. The bearing 37 is provided with an extension 44 to receive the spring member 40 and is cut away at 45 to permit the reception of the gears or pinions 42 on the shaft 41 of the lower slat 33. The gears 42 are revolubly mounted on the shaft 41, and as they engage oppositely disposed racks it is impossible to rack or incline the bottom bar, that is, it is impossible to cause one end of the bottom bar to raise higher than the other end.

The construction therefore provides for the even raising of the bottom bar and, consequently, the slats which are stacked upon the bottom bar during the raising movement thereof.

Lateral jarring or clashing of the bearing members 37 with the guide is prevented by the resilient protruding discs 44' on the end of the extensions 44. These resilient members are of rubber, leather or the like, and are preferably cylindrical in form, extending for a considerable distance into the extension 44. They may be assembled by first drilling and tapping the extension and then twisting the cylindrical resilient member into the threaded aperture.

Figure 13:
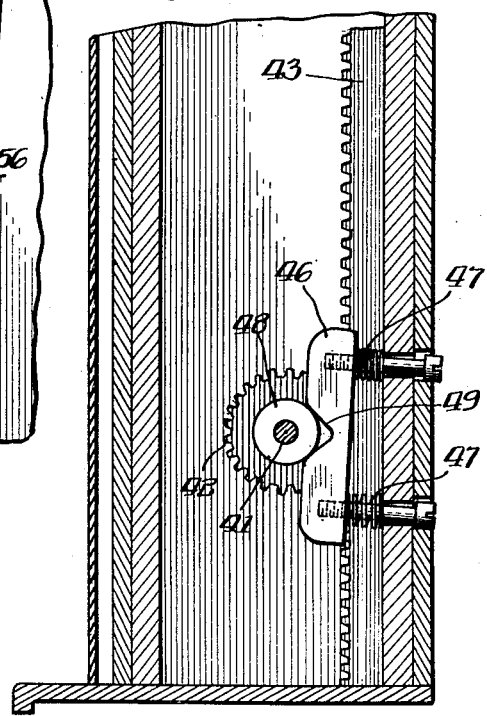
Fig. 13 is a detail transverse sectional view on the line 13—13 of Fig. 9.

Stops 46 are mounted in the side frames 2 and 3, Fig. 13, and are provided with springs 47 to receive a collar stop member 48 mounted on the shaft 41 inwardly of the gears or pinions 42. Each stop member is provided with a cut-away portion or notch 49 to receive the stop member 48 at the upper and lower limits of travel of the bottom bar.

The slats 35 are provided with extensions 50, Fig. 3, which are received in slots at each side of the frame. The ends of the slats and the projecting portion 50 may be provided with noise reducing elements 51 which are in the form of caps or pads designated by the numeral 39 in applicant's Patent No. 2,174,249, issued September 26, 1939, and assigned to the present assignee.

Figure 14:
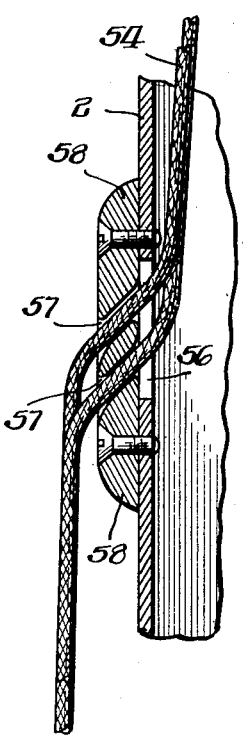
Fig. 14 is a detail sectional view on the line 14—14 of Fig. 9.

The shaft 31 of the top tilt bar 30 extends through the side frame 2, Fig. 5, and has fixed thereto a roller or pulley element 52, Figs. 5, 6, 9 and 12. The periphery of the pulley 52 is V-shaped, as clearly indicated at 53 in Fig. 9, and is adapted to receive a cord operating member 54. A framework 55 extends around the pulley 52, Figs. 6, 9 and 12, to cause the cord 54 to always remain in proper position about the periphery of the pulley 52. The cord 54 has its free ends extending through an opening 56 formed in the front of the side bar 2, and passes through diagonally alined slots 57 provided in a cord receiving member 58, Fig. 14, which is fastened to the front of the side member 2. Operation of the cord 54, therefore, causes rotative movement of the pulley 52, which causes rotative or tilting movement of the top tilting bar 30. Thus, depending upon which end of the cord 54 is pulled, the slats will be tilted in a corresponding direction as the tilting of the top bar causes movement of the tapes 32 and, consequently, corresponding movement of all the slats. Ornamental strips or molds 59 may be arranged at the sides to cover the side frames 2 and 3, and an ornamental top piece 60 may be fastened to the top member 5. An operating handle 61, Fig. 1, may be connected to the lowermost or bottom bar 36 to permit manual vertical movement and operation of the blind.

In view of the structure, described above, maintaining the lower bar always in a horizontal position, the latter member may be actuated to raise the blind at any point along its length. Accordingly, the operating handle is preferably elongated and coextensive with the bottom bar 36 as shown in Fig. 1.

An alternative preferred form of stop structure is disclosed in Figs. 15 to 18, inclusive, wherein stop members 62 extend longitudinally along the side frames 2 and 3 and provide a continuous bearing surface 64, maintained in contact with the collar stop member 48 on the shaft 41 through the agency of the springs 47. Each stop member is provided with four notches 66 arranged to receive the stop collar 48 not only at the upper and lower limits of travel but at a pre-selected intermediate position. It will be apparent that any preferred number of stop positions can be provided. According to the preferred embodiment disclosed, two relatively closely adjacent notches are provided near the upper end to accommodate the stop collar 48 with the lowermost bar in its elevated position. As indicated most clearly in Figs. 16 and 17, these two notches permit selective locking of the bottom bar, whether it is in horizontal position or whether it is tilted as in the latter figure. According to the structure shown, the notches 66 have the same radius of curvature as the collar 48. It will be apparent that the stop members 62 not only serve to lock the bottom bar at predetermined positions, but also constantly produce a braking action on the bottom bar, through the pressure of the surface 64 against the collar 48.

The side frame member 2 shown in Fig. 18 has a generally channel-shaped section with an extruded inwardly extending flange or web 68 spaced from the rear wall. The angle member is secured to the opposite side of the channel member 2 with a flange 72 projecting oppositely toward the flange 68 to provide a guideway therebetween.

The invention provides an easy, positive, silently operating blind which is raised and lowered manually and which can have its slats tilted by the manual operation of tilting cords passing through the front of the blind frame. The blind is positioned within a frame and comprises a complete unit including the blind proper and its frame, whereby the entire unit may be readily and quickly arranged and fastened in position within an opening. The rack and pinion arrangement prevents one side of the blind from raising faster than its opposite side, and the flexible stop members cause the blind to be maintained in either its upper or lower position regardless of vibration.

The slats disclosed in the accompanying drawings are composite slats, that is, they have a fibrous core which is covered with sheet metal. The blind is noiseless in operation and is simple in construction. The rollers which carry the suspending tapes are capable of adjustment to take up the slack in the tape due to stretching or otherwise, while the spring in the upper roller is adapted to be adjusted to compensate for wear, if and when necessary.

Changes may be made in the form, construction, and arrangement of the parts without departing from the spirit of the invention or sacrificing any of the advantages thereof, and the right is hereby reserved to make all such changes as fairly fall within the scope of the following claims.

What I claim is:

1. In a Venetian blind or the like, the combination of a frame comprising opposed vertical frame members, a plurality of superposed, connected slats arranged therebetween, a plurality of spaced apart stop members mounted in one of said frame members and means carried by one of said slats and engaging said stop members for retaining the blind in adjusted positions.

2. In a Venetian blind or the like, the combination of a frame comprising opposed vertical frame members, a plurality of superposed, connected slats arranged therebetween, the bottom of said slats having a portion projecting into one of said frame members, and a plurality of spaced-apart, spring-operated stop members mounted in said frame member, each of said stop members having a notch for engaging the projecting portion of the bottom slat to thereby retain the blind in adjusted position.

3. In a Venetian blind or the like, in combination, a frame, a plurality of superposed slats, a spring-operated roller mounted in said frame above said slats, a plurality of tapes, means connecting one end of each of said tapes to opposite sides of one of said slats and means adjustably connecting the other end of each of said tapes to said spring roller whereby the operative lengths of each of said tapes may be individually adjusted.

4. In a Venetian blind, opposed vertical frame members, a plurality of superposed slats carried therebetween, a rod carried by one of said slats and extending into said frame members, and spring means mounted on opposed ends of said rod and engaging the walls of said frame members for preventing swaying of the blind.

5. In a Venetian blind, opposed vertical frame members forming hollow channels, a plurality of superposed slats carried therebetween, a rod carried by one of said slats and extending into said channels, spring means mounted on opposed ends of said rod and engaging the walls of said channels for preventing swaying of the blind and interengaging means carried upon the ends of said rod and upon the walls of said channels for preventing canting of the slats.

6. A Venetian blind or the like, comprising a plurality of superposed slats, a spring tensioned roller mounted above said slats, tape receiving rollers adjustably mounted on the roller, a plurality of tapes having their lower ends connected to a lower slat and their upper ends to the tape receiving rollers, and means for varying the spring tension on said roller.

7. A Venetian blind or the like, comprising a plurality of vertically superposed slats, a spring tensioned roller mounted above the slats, a plurality of tapes having their lower ends connected to a lower slat and their upper ends connected to the roller, and roller means adjustably mounted on the roller and interposed between the upper ends of said tape and the roller to adjust the operative lengths of said tapes.

8. In a Venetian blind or the like, the combination with spaced side guides, a plurality of vertically spaced slats adapted for vertical movement between said guides, a spring tensioned roller mounted above the slats, tape rollers mounted on the roller, a plurality of tapes each having one end connected to a lower slat and the upper end to a said tape roller, and adjustable means interposed between said tape rollers and the roller to vary the spring tension.

9. In a Venetian blind or the like, the combination with spaced side guides, a plurality of vertically spaced slats adapted for vertical movement between said guides, a spring tensioned roller mounted above the slats, a plurality of tapes having one end connected to a lower slat and the upper end to said roller, and means interposed between the upper ends of each of said tapes and the roller whereby the operative lengths of the tapes may be individually adjusted.

RAYMOND C. PRATT.